(12) United States Patent
Philip et al.

(10) Patent No.: US 11,763,014 B2
(45) Date of Patent: Sep. 19, 2023

(54) PRODUCTION PROTECTION CORRELATION ENGINE

(71) Applicant: Bank of America Corporation, Charlotte, NC (US)

(72) Inventors: Charles Philip, Mumbai (IN); Richard John Woodward, Warrington (GB); Souradeep Chakroborty, Kolkata (IN)

(73) Assignee: Bank of America Corporation, Charlotte, NC (US)

( * ) Notice: Subject to any disclaimer, the term of this patent is extended or adjusted under 35 U.S.C. 154(b) by 387 days.

(21) Appl. No.: 16/916,889

(22) Filed: Jun. 30, 2020

(65) Prior Publication Data

US 2021/0406391 A1  Dec. 30, 2021

(51) Int. Cl.
  *G06F 21/62* (2013.01)
  *G06F 21/60* (2013.01)
  *H04L 9/40* (2022.01)

(52) U.S. Cl.
  CPC ........ *G06F 21/6218* (2013.01); *G06F 21/604* (2013.01); *H04L 63/101* (2013.01); *H04L 63/102* (2013.01); *H04L 63/20* (2013.01); *G06F 2221/2141* (2013.01)

(58) Field of Classification Search
  CPC .............. G06F 21/6218; G06F 21/604; G06F 2221/2141; H04L 63/101; H04L 63/102; H04L 63/20
  See application file for complete search history.

(56) References Cited

U.S. PATENT DOCUMENTS

| | | | |
|---|---|---|---|
| 7,281,263 B1 | 10/2007 | LaMastres et al. | |
| 7,644,008 B1 | 1/2010 | Issa et al. | |
| 7,941,336 B1 | 5/2011 | Robin-Jan | |
| 9,582,673 B2* | 2/2017 | Wahl | G06F 21/604 |
| 9,990,636 B1* | 6/2018 | Lewis | G06Q 30/016 |
| 10,042,657 B1* | 8/2018 | Lauinger | H04L 67/1097 |
| 10,148,701 B1* | 12/2018 | Hecht | G06F 9/455 |
| 10,257,228 B2 | 4/2019 | Gutesman et al. | |
| 10,803,166 B1* | 10/2020 | Terkowitz | G06F 11/3684 |
| 11,308,234 B1* | 4/2022 | Stapleton | G06F 21/6245 |
| 11,392,947 B1* | 7/2022 | Prasad | G06Q 20/06 |
| 2002/0026592 A1 | 2/2002 | Gavrila et al. | |
| 2002/0120482 A1 | 8/2002 | Anderson et al. | |

(Continued)

*Primary Examiner* — Jason Chiang
(74) *Attorney, Agent, or Firm* — Banner & Witcoff, Ltd.

(57) ABSTRACT

Aspects of the disclosure relate to a production protection correlation engine. In some embodiments, a computing platform may acquire access permission data aggregated from a plurality of data sources and normalize the access permission data. Then, the computing platform may identify user-specific entitlements and classify user roles. Next, the computing platform may tag the normalized permission data based on user role classification data. Based on the tagging, the computing platform may identify at least one enterprise user having one or more toxic access permissions and, in response, trigger an access review process. In turn, the computing platform may revoke one or more incompatible access permissions. Then, the computing platform may transmit updated access permission data to a system of record, causing the system of record to store the updated access permission data in a database and limit access to enterprise resources based on the updated access permission data.

20 Claims, 8 Drawing Sheets

(56) References Cited

U.S. PATENT DOCUMENTS

| | | |
|---|---|---|
| 2005/0209899 A1 | 9/2005 | King et al. |
| 2008/0052102 A1* | 2/2008 | Taneja ................. G06Q 10/063 |
| | | 705/7.11 |
| 2008/0086473 A1 | 4/2008 | Searl et al. |
| 2009/0320088 A1 | 12/2009 | Gill et al. |
| 2010/0082685 A1 | 4/2010 | Barr Hoisman et al. |
| 2012/0042354 A1 | 2/2012 | Vitiello et al. |
| 2012/0079556 A1 | 3/2012 | Wahl |
| 2013/0318088 A1* | 11/2013 | Futty ................. G06F 16/24564 |
| | | 707/E17.089 |
| 2014/0181913 A1 | 6/2014 | Kling et al. |
| 2015/0012966 A1 | 1/2015 | Tandon |
| 2015/0135296 A1 | 5/2015 | Cason et al. |
| 2015/0370824 A1* | 12/2015 | Chui ....................... G06F 16/21 |
| | | 707/786 |
| 2016/0119380 A1 | 4/2016 | Gutesman et al. |
| 2016/0381032 A1* | 12/2016 | Hashmi ................... G06F 9/468 |
| | | 726/4 |
| 2017/0295197 A1* | 10/2017 | Parimi .................... H04L 63/10 |
| 2018/0063157 A1 | 3/2018 | Vidhun et al. |
| 2018/0183801 A1* | 6/2018 | Viswanath ............ H04L 63/101 |
| 2018/0278614 A1 | 9/2018 | Miller et al. |
| 2019/0012442 A1* | 1/2019 | Hunegnaw ............. G06N 20/00 |
| 2019/0182262 A1 | 6/2019 | Raposa |
| 2020/0097872 A1 | 3/2020 | Hirsch |
| 2020/0242536 A1* | 7/2020 | Schwantes .............. G06F 17/16 |
| 2020/0403996 A1* | 12/2020 | Parimi .................. H04L 63/102 |
| 2021/0099494 A1* | 4/2021 | Kuehr-McLaren ... H04L 63/102 |
| 2021/0144144 A1* | 5/2021 | Parks ...................... G06N 20/00 |
| 2021/0209535 A1* | 7/2021 | Tezak ................... G06F 3/0482 |
| 2022/0182386 A1* | 6/2022 | Viswanathan ......... G06Q 20/20 |

* cited by examiner

PRODUCTION PROTECTION CORRELATION ENGINE

BACKGROUND

Aspects of the disclosure relate to computer system security and preventing unauthorized access to secure information systems. In particular, one or more aspects of the disclosure relate to a production protection correlation engine for identity and access management.

Ensuring that enterprise users are not given permissions to exercise conflicting roles may be critically important for reducing the risk of erroneous and inappropriate actions. For example, users with development roles may be found to have unwarranted privileged read-write permissions or code-promotion permissions in a production environment, while users with production support roles may be found to have unwarranted code check-in permissions in a development environment. In many instances, it may be difficult to identify and manage such toxic access permissions effectively and efficiently.

SUMMARY

Aspects of the disclosure provide effective, efficient, scalable, and convenient technical solutions that address and overcome the technical problems associated with computer system security. In particular, one or more aspects of the disclosure provide a production protection correlation engine configured to detect, identify, and/or prevent segregation of duties violations and/or information security violations, thereby preventing unauthorized access to secure information systems.

In accordance with one or more embodiments, a computing platform having at least one processor, a communication interface, and memory may acquire, via the communication interface, access permission data. In addition, the access permission data may be aggregated from a plurality of data sources. Subsequently, the computing platform may convert the access permission data into a normalized format. In addition, converting the access permission data into the normalized format may produce normalized permission data. Thereafter, the computing platform may identify user-specific entitlements based on the normalized permission data. Next, the computing platform may classify user roles for a plurality of enterprise users. In addition, classifying the user roles for the plurality of enterprise users may produce user role classification data. Then, the computing platform may tag the normalized permission data based on the user role classification data. Based on tagging the normalized permission data, the computing platform may identify at least one enterprise user of the plurality of enterprise users having one or more toxic access permissions. In response to identifying the at least one enterprise user of the plurality of enterprise users having the one or more toxic access permissions, the computing platform may trigger an access review process for the at least one enterprise user of the plurality of enterprise users having the one or more toxic access permissions. Based on triggering the access review process for the at least one enterprise user of the plurality of enterprise users having the one or more toxic access permissions, the computing platform may revoke one or more incompatible access permissions. In addition, revoking the one or more incompatible access permissions may produce updated access permission data. Then, the computing platform may transmit, via the communication interface, to a system of record, the updated access permission data. In addition, transmitting the updated access permission data to the system of record may cause the system of record to store the updated access permission data in a database and limit access to enterprise resources based on the updated access permission data.

In some embodiments, classifying the user roles for the plurality of enterprise users may include determining, for each enterprise user of the plurality of enterprise users, an enterprise role for the enterprise user based on organizational hierarchy information and the enterprise user's association with at least one computing environment of a plurality of enterprise computing environments.

In some embodiments, determining, for each enterprise user of the plurality of enterprise users, the enterprise role for the enterprise user may include determining the enterprise role for the enterprise user to be one of development, quality assurance, production, or DevOps.

In some embodiments, the plurality of enterprise computing environments may include a production environment and a non-production environment.

In some embodiments, the non-production environment may include one or more of: a development environment, a testing environment, or a quality assurance environment.

In some embodiments, triggering the access review process may include generating and/or sending one or more user interfaces (UIs) to an enterprise security system.

In some embodiments, the computing platform may generate a graphical representation of the normalized permission data and send, via the communication interface, to an enterprise security system, the graphical representation of the normalized permission data. In addition, sending the graphical representation of the normalized permission data to the enterprise security system may cause the enterprise security system to display the graphical representation of the normalized permission data.

In some embodiments, the computing platform may generate a graphical representation of the updated access permission data and send, via the communication interface, to an enterprise security system, the graphical representation of the updated access permission data. In addition, sending the graphical representation of the updated access permission data to the enterprise security system may cause the enterprise security system to display the graphical representation of the updated access permission data.

In some embodiments, converting the access permission data into a normalized format may include converting the access permission data into the normalized format using one or more of: regular expression, data wrangling operations, structured query language, or natural language processing.

In some embodiments, identifying user-specific entitlements based on the normalized permission data may include identifying user-specific entitlements using machine learning.

In some embodiments, the computing platform may monitor identification of enterprise users having one or more toxic access permissions, generate a notification indicating a presence of the toxic access permissions amongst the enterprise users, and send, via the communication interface, to an enterprise security system, the notification indicating the presence of the toxic access permissions amongst the enterprise users.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
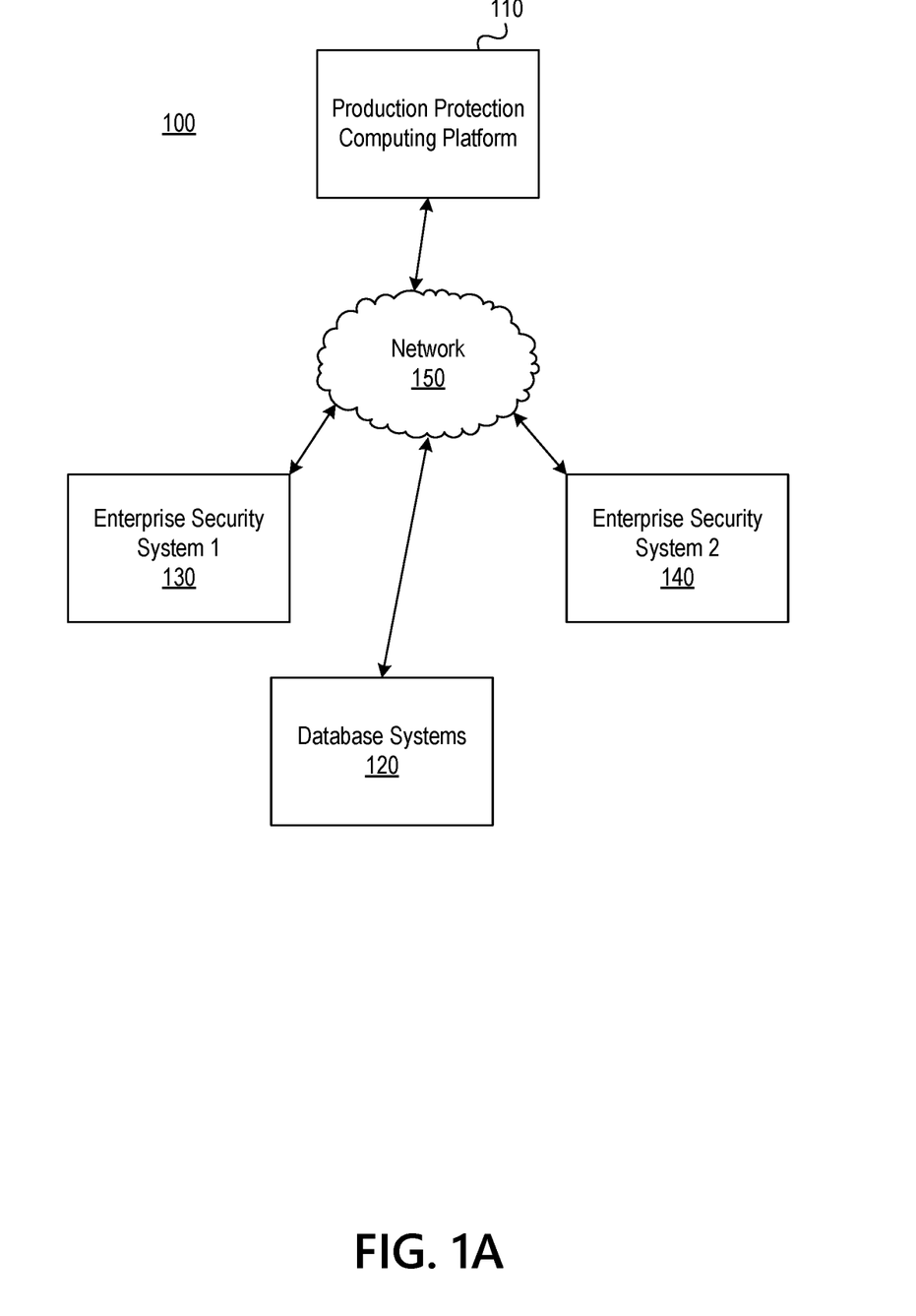
FIGS. 1A and 1B depict an illustrative computing environment for a production protection correlation engine in accordance with one or more example embodiments.
Figure 1B:
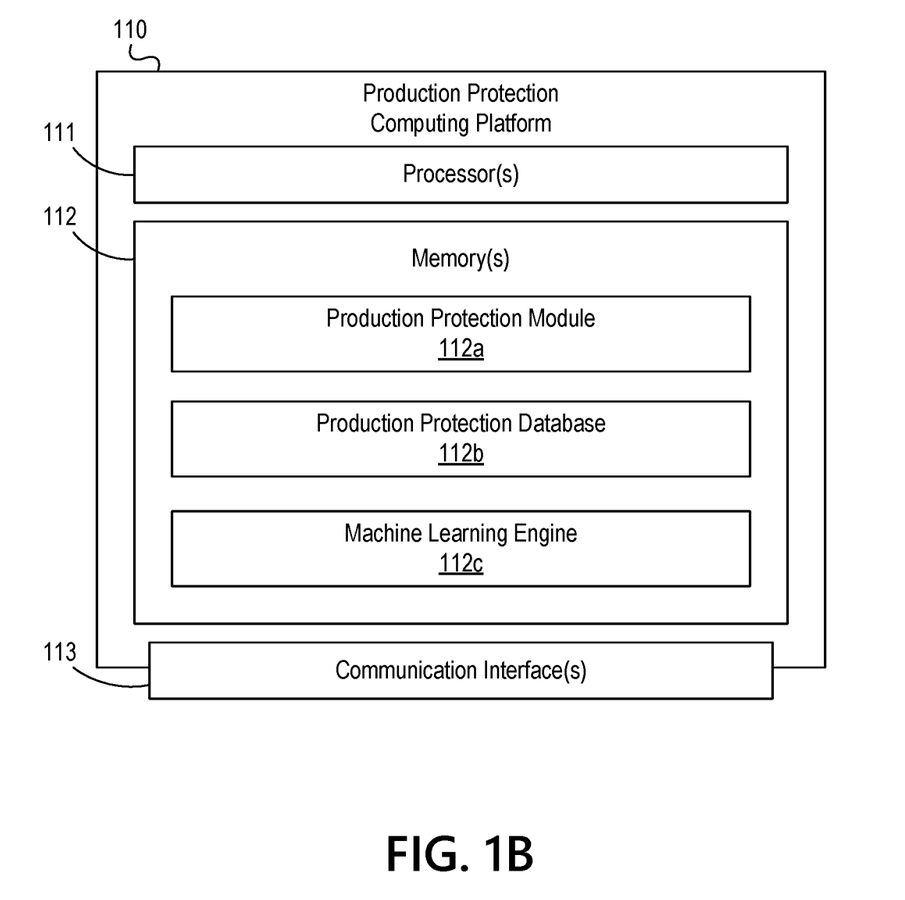

FIGS. 1A and 1B depict an illustrative computing environment for a production protection correlation engine in accordance with one or more example embodiments. Referring to FIG. 1A, computing environment 100 may include one or more computer systems. For example, computing environment 100 may include a production protection computing platform 110, database systems 120 (which may, e.g., be and/or include a system of records), a first enterprise security system 130, and a second enterprise security system 140.

As illustrated in greater detail below, production protection computing platform 110 may include one or more computing devices configured to perform one or more of the functions described herein. For example, production protection computing platform 110 may include one or more computers (e.g., laptop computers, desktop computers, servers, server blades, or the like).

Database systems 120 may include a system of records (SOR). For example, database systems 120 may include different information storage entities storing one or more operational datasets.

Enterprise security system 130 may include one or more computing devices and/or other computer components (e.g., processors, memories, communication interfaces). For instance, enterprise security system 130 may be a server, desktop computer, laptop computer, tablet, mobile device, or the like, that is associated with an enterprise organization. Enterprise security system 140 may include one or more computing devices and/or other computer components (e.g., processors, memories, communication interfaces). For instance, enterprise security system 140 may be a server, desktop computer, laptop computer, tablet, mobile device, or the like, that is associated with an enterprise organization. In some arrangements, enterprise security system 130 and enterprise security system 140 may be owned and/or operated by one or more entities.

Computing environment 100 also may include one or more networks, which may interconnect one or more of production protection computing platform 110, database systems 120, enterprise security system 130, and enterprise security system 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, production protection computing platform 110, database systems 120, enterprise security system 130, and enterprise security system 140 may be associated with an organization, and a private sub-network included in network 150 and associated with and/or operated by the organization may include one or more networks (e.g., LANs, WANs, virtual private networks (VPNs), or the like) that interconnect production protection computing platform 110, database systems 120, enterprise security system 130, and enterprise security system 140. Network 150 also may include a public sub-network that may connect the private sub-network and/or one or more computing devices connected thereto (e.g., production protection computing platform 110, database systems 120, enterprise security system 130, and enterprise security system 140) with one or more networks and/or computing devices that are not associated with the organization.

In one or more arrangements, production protection computing platform 110, database systems 120, enterprise security system 130, and enterprise security system 140 may be any type of computing device capable of receiving a user interface, receiving input via the user interface, and communicating the received input to one or more other computing devices. For example, production protection computing platform 110, database systems 120, enterprise security system 130, enterprise security system 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, production protection computing platform 110 may include one or more processor(s) 111, memory(s) 112, and communication interface(s) 113. A data bus may interconnect processor 111, memory 112, and communication interface 113. Communication interface 113 may be a network interface configured to support communication between production protection computing platform 110 and one or more networks (e.g., network 150 or the like). Memory 112 may include one or more program modules having instructions that when executed by processor 111 cause production protection computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of production protection computing platform 110 and/or by different computing devices that may form and/or otherwise make up production protection computing platform 110. For example, memory 112 may have, store, and/or include a production protection module 112*a*, a production protection database 112*b*, and a machine learning engine 112c. Production protection module 112a may have instructions that direct and/or cause production protection computing platform 110 to, for example, identify and segregate users with development roles and production-support roles vis-à-vis the permissions they own that are conflicting in nature and which, therefore, lead to toxicity in entitlements and/or perform other functions, as discussed in greater detail below. Production protection database 112b may store information used by production protection module 112a and/or production protection computing platform 110 in detecting, identifying, and/or preventing segregation of duties violations and/or in performing other functions. Machine learning engine 112c may have instructions that direct and/or cause production protection computing platform 110 to set, define, and/or iteratively redefine rules, techniques and/or other parameters used by production protection computing platform 110 and/or other systems in computing environment 100 in detecting, identifying, and/or preventing segregation of duties violations.

Figure 2A:
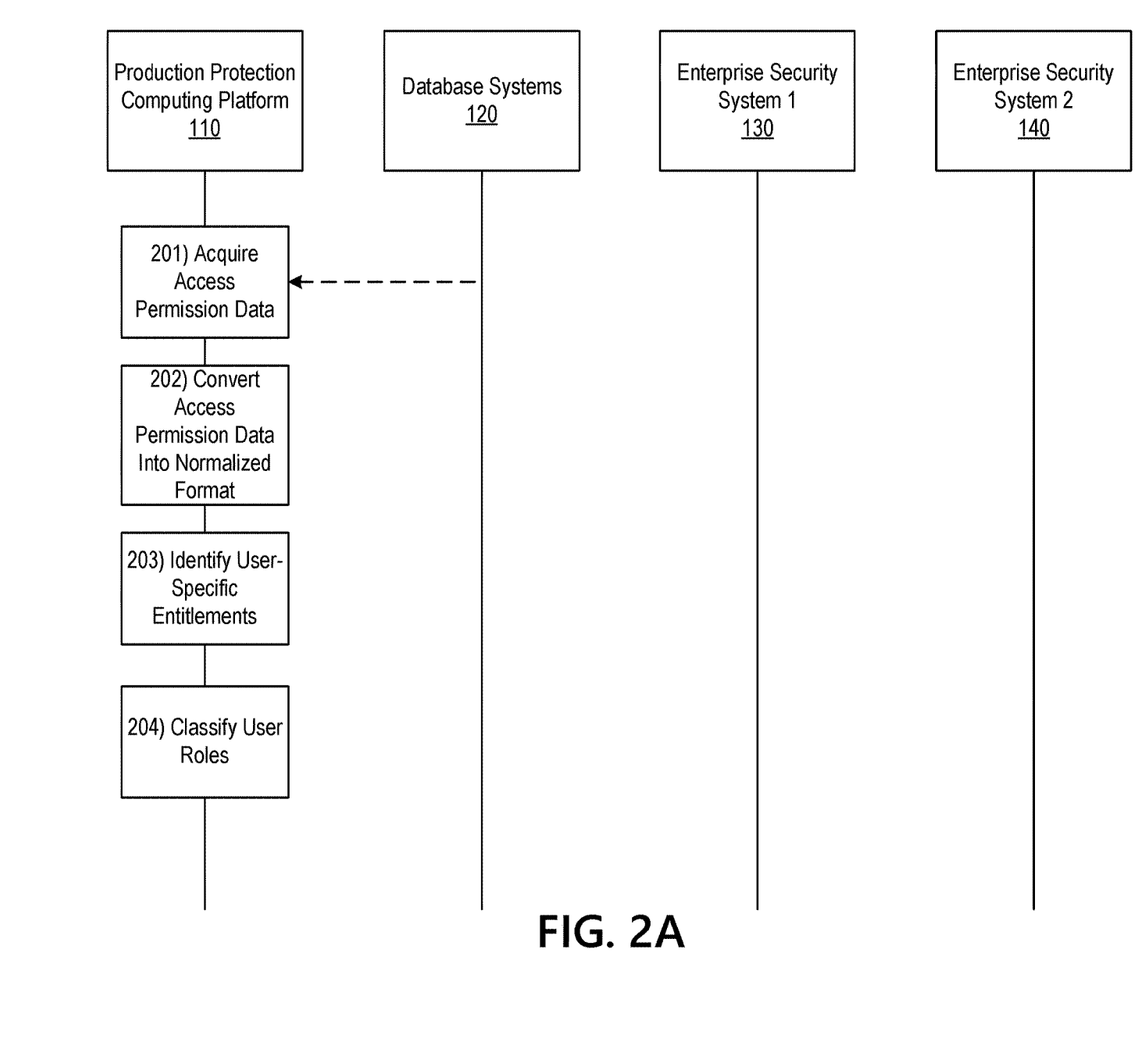
FIGS. 2A-2D depict an illustrative event sequence for a production protection correlation engine in accordance with one or more example embodiments.

FIGS. 2A-2D depict an illustrative event sequence for a production protection correlation engine in accordance with one or more example embodiments. Referring to FIG. 2A, at step 201, production protection computing platform 110 may acquire, via the communication interface (e.g., communication interface 113), access permission data, which may be aggregated from a plurality of data sources (e.g., a system of records), such as database systems 120.

At step 202, production protection computing platform 110 may convert the access permission data into a normalized format, which produces normalized permission data. In some embodiments, converting the access permission data into a normalized format may include converting the access permission data into the normalized format using one or more of: regular expression, data wrangling operations (e.g., cleaning data, converting one form of data into another, and mapping and storing data), structured query language, or natural language processing. For example, in converting the access permission data into the normalized format, production protection computing platform 110 may remove duplicate data, resolve conflicting data, convert the data into a format that allows for further processing and analysis, and/or consolidate the data into an organized structure.

At step 203, production protection computing platform 110 may identify user-specific entitlements based on the normalized permission data. In some embodiments, identifying user-specific entitlements based on the normalized permission data may include identifying user-specific entitlements using machine learning. An entitlement may refer to an association between a user, a resource, and a permission. A permission may refer to a set of access rights (e.g., read, write, execute) the user may perform on the resource. For example, a user may be assigned an entitlement indicating a resource the user is entitled to access and defining a set of permissions regarding such access. Furthermore, a user may be said to have an entitlement or be assigned an entitlement when an association exists between a user account, a resource, and a permission.

At step 204, production protection computing platform 110 may classify user roles for a plurality of enterprise users, which produces user role classification data. In some embodiments, classifying the user roles for the plurality of enterprise users may include determining, for each enterprise user of the plurality of enterprise users, an enterprise role for the enterprise user based on organizational hierarchy information and the enterprise user's association with at least one computing environment of a plurality of enterprise computing environments. For example, in classifying the user roles for the plurality of enterprise users, production protection computing platform 110 may group users into roles and determine their access permissions based on the function of each role. For instance, users who develop programs might be grouped under a development role, and the users assigned to this role may be given permission to access a development environment. In some embodiments, determining, for each enterprise user of the plurality of enterprise users, the enterprise role for the enterprise user may include determining the enterprise role for the enterprise user to be one of development, quality assurance, production, or DevOps. In some embodiments, the plurality of enterprise computing environments may include a production environment and a non-production environment. In addition, the non-production environment may include one or more of: a development environment, a testing environment, or a quality assurance environment.

Figure 2B:
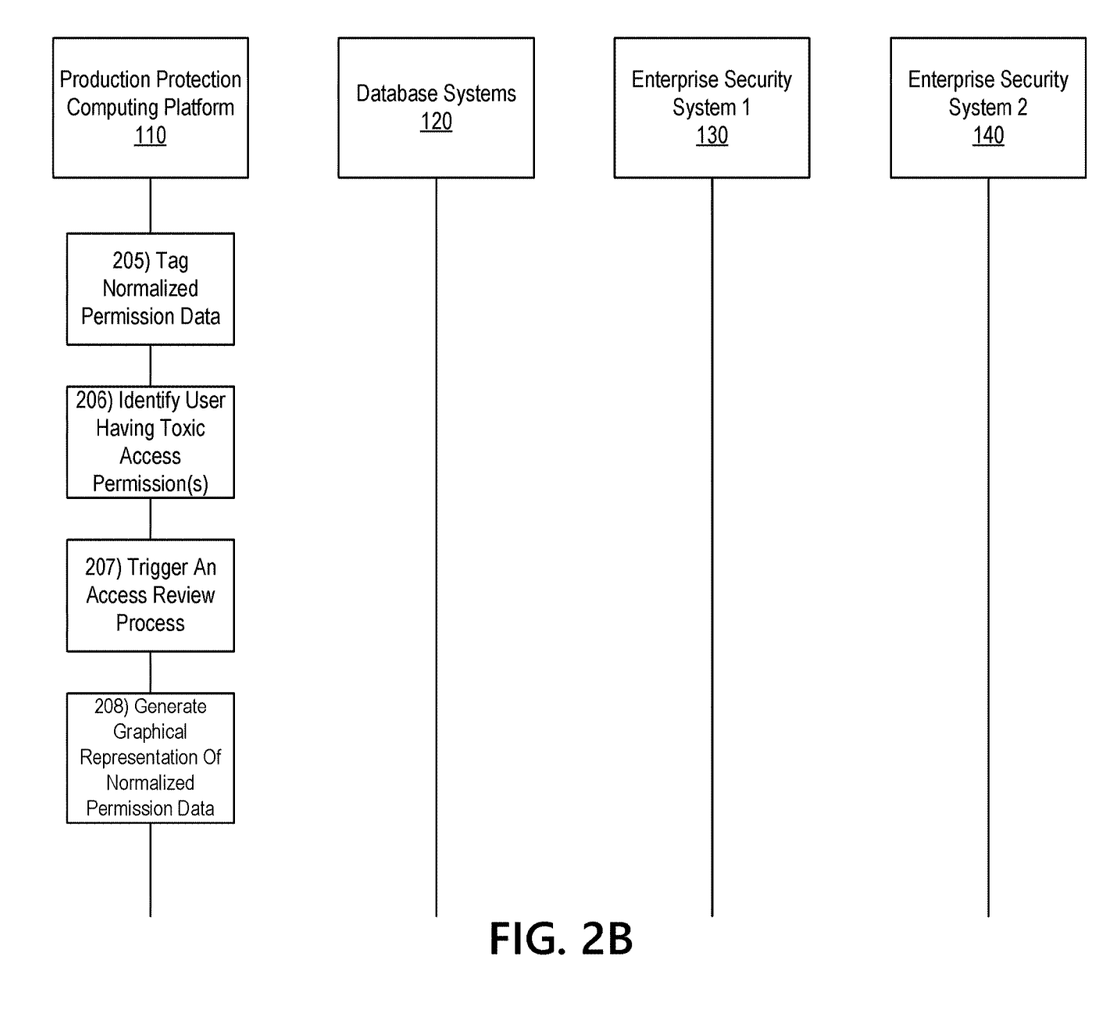

Referring to FIG. 2B, at step 205, production protection computing platform 110 may tag the normalized permission data based on the user role classification data. For example, in tagging the normalized permission data based on the user role classification data, production protection computing platform 110 may tag access permissions for a developer corresponding to a development role. At step 206, based on tagging the normalized permission data, production protection computing platform 110 may identify at least one enterprise user of the plurality of enterprise users having one or more toxic access permissions. For example, toxic access permissions may refer to an enterprise user tagged as a developer but has cross-access permissions in a production environment and a non-production environment. In addition, in identifying at least one enterprise user of the plurality of enterprise users having one or more toxic access permissions, production protection computing platform 110 may establish defined and allowed access permissions for enterprise roles and/or identify common and recurring segregation of duties violations.

At step 207, in response to identifying the at least one enterprise user of the plurality of enterprise users having the one or more toxic access permissions, production protection computing platform 110 may trigger an access review process for the at least one enterprise user of the plurality of enterprise users having the one or more toxic access permissions.

In some embodiments, triggering the access review process may include generating and/or sending one or more user interfaces (UIs) to an enterprise security system. For instance, in some embodiments, at step 208, production protection computing platform 110 may generate a graphical representation of the normalized permission data. Subsequently, referring to FIG. 2C, at step 209, production protection computing platform 110 may send, via the communication interface (e.g., communication interface 113), to an enterprise security system (e.g., enterprise security system 130), the graphical representation of the normalized permission data. In addition, sending the graphical representation of the normalized permission data to the enterprise security system may, at step 210, cause the enterprise security system to display the graphical representation of the normalized permission data. For instance, production protection computing platform 110 may, at step 210, cause enterprise security system 130 to display and/or otherwise present one or more graphical user interfaces similar to graphical user interface 300, which is illustrated in FIG. 3.

Figure 3:
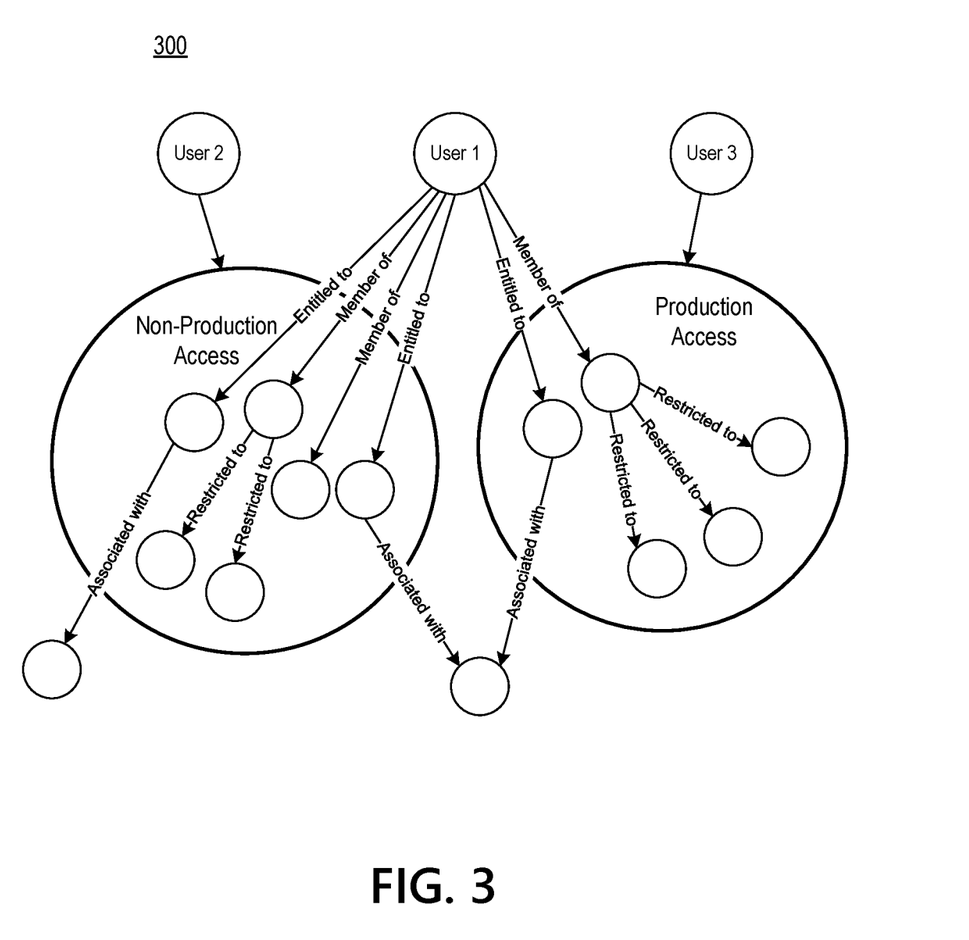
FIG. 3 depicts an example graphical user interface for a production protection correlation engine in accordance with one or more example embodiments.

As seen in FIG. 3, graphical user interface 300 may include text and/or other information indicating the at least one enterprise user of the plurality of enterprise users identified by the production protection computing platform 110 as having one or more toxic access permissions (e.g., User 1 being a toxic user, having both "Non-Production Access" and "Production Access").

Returning to FIG. 2C, at step 211, based on triggering the access review process for the at least one enterprise user of the plurality of enterprise users having the one or more toxic access permissions, production protection computing platform 110 may revoke one or more incompatible access permissions. For example, the one or more incompatible access permissions may refer to access permissions that are conflicting in nature, such access permissions to both a production environment and a non-production environment. In addition, revoking the one or more incompatible access permissions may produce updated access permission data. For example, in revoking the one or more incompatible access permissions, production protection computing platform 110 may produce updated access permission data that includes only compatible access permissions. For instance, a segregation of duties violation may occur where the access request, if granted, would associate incompatible tasks with an enterprise user. Incompatible tasks may, for example, refer to tasks that should not be performed by the same person for reasons of security, integrity, or propriety. Accordingly, identifying incompatible tasks allows for the identification of incompatible access permissions. If two tasks are identified as incompatible, then, in some example implementations, the access permissions respectively associated with those tasks may be identified as incompatible access permissions.

Figure 2C:
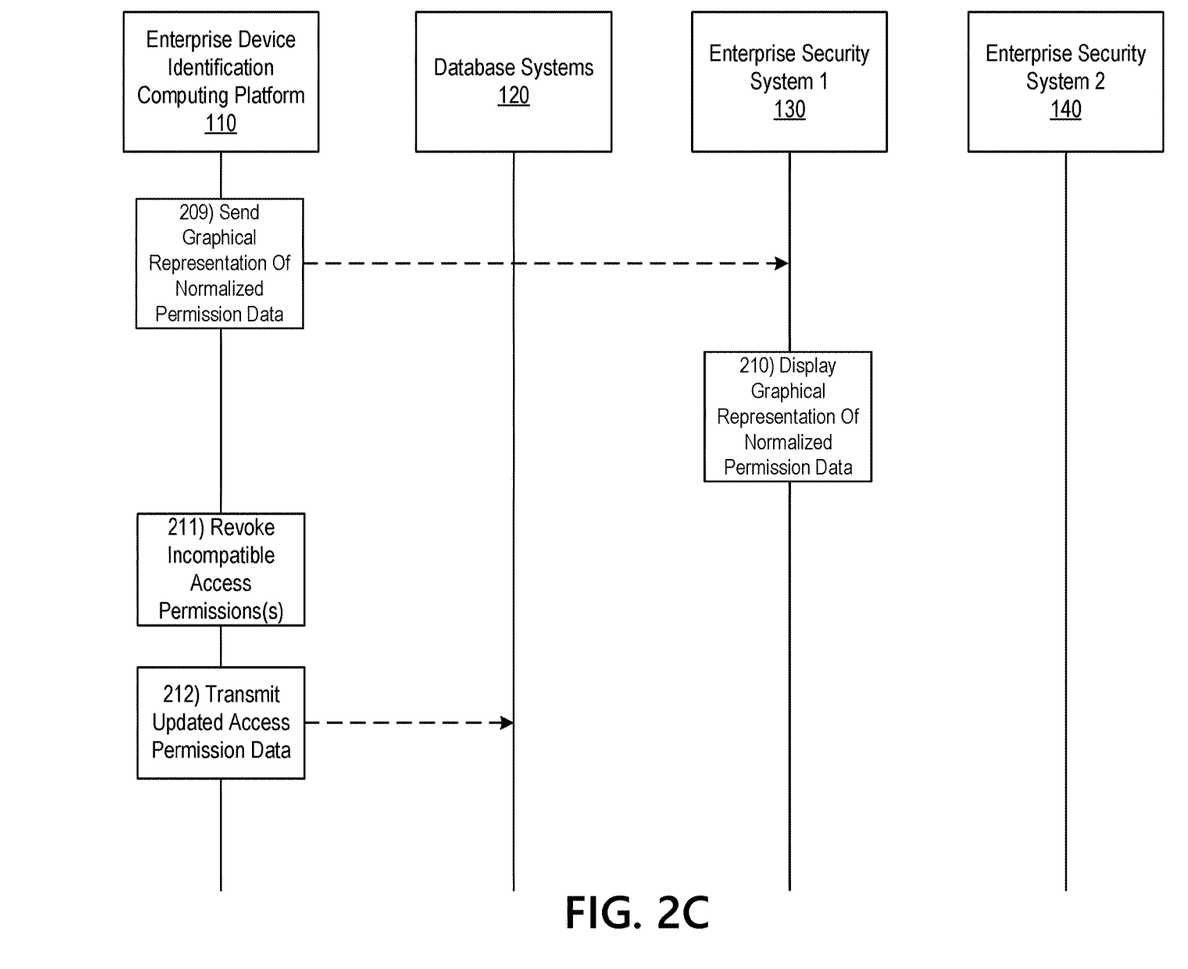

At step 212, production protection computing platform 110 may transmit, via the communication interface, to a system of record (e.g., database systems 120), the updated access permission data. The updated access permissions data may, for instance, include information indicating only compatible access permissions. In addition, transmitting the updated access permission data to the system of record may cause the system of record to store the updated access permission data in a database and limit access to enterprise resources based on the updated access permission data.

Figure 2D:
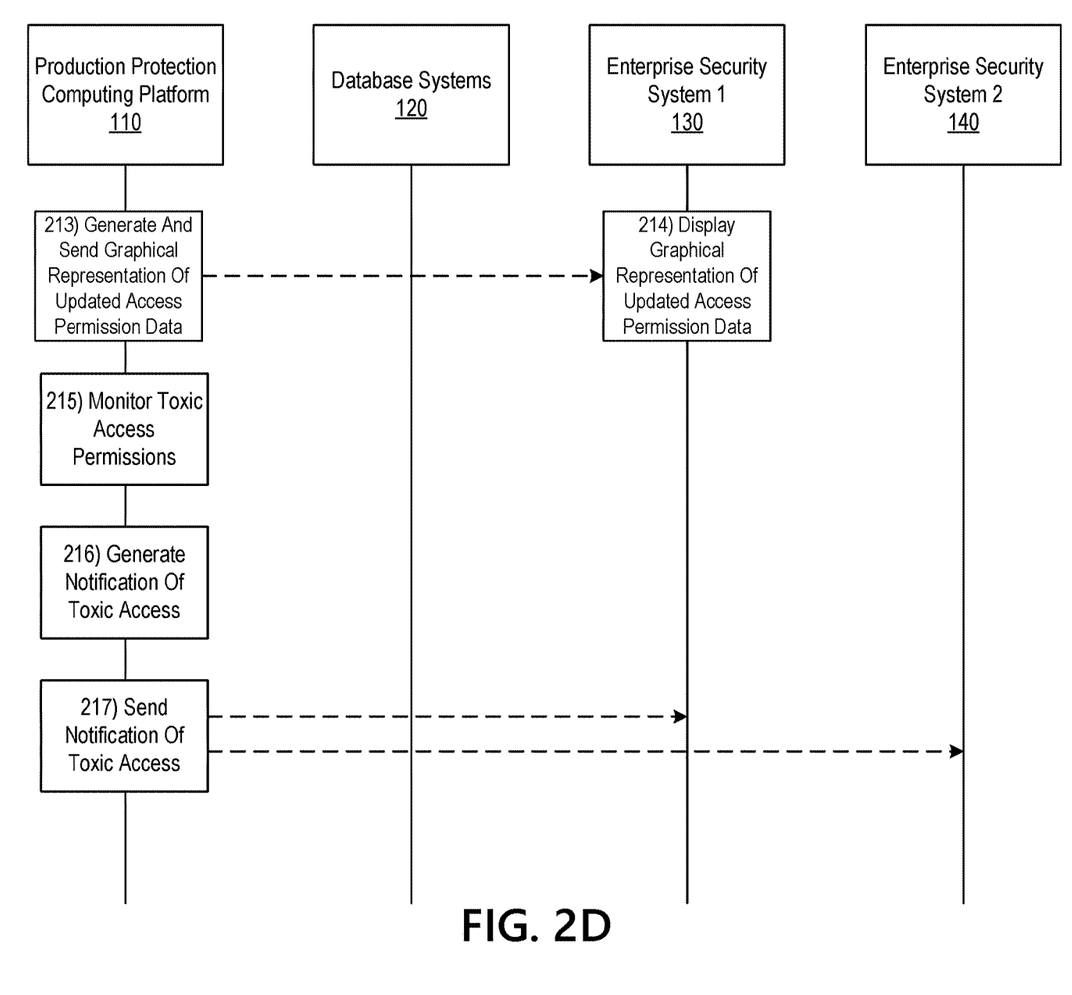

In some embodiments, referring to FIG. 2D, at step 213, production protection computing platform 110 may generate and send, via the communication interface (e.g., communication interface 113), to an enterprise security system (e.g., enterprise security system 130), a graphical representation of the updated permission data. In turn, at step 214, sending the graphical representation of the updated permission data to the enterprise security system may cause the enterprise security system to display the graphical representation of the updated permission data. For example, the graphical representation may help an enterprise user understand and visualize current access permissions.

In some embodiments, production protection computing platform 110 may initiate one or more active monitoring processes and/or generate and send one or more notification/alert messages. For instance, at step 215, production protection computing platform 110 may monitor identification of enterprise users having one or more toxic access permissions. For example, in monitoring identification of enterprise users having one or more toxic access permissions, production protection computing platform 110 may periodically request, receive, and/or exchange data with other systems. At step 216, production protection computing platform 110 may generate a notification (e.g., alert) indicating a presence of the toxic access permissions amongst the enterprise users. At step 217, production protection computing platform 110 may send, via the communication interface (e.g., communication interface 113), to an enterprise security system (e.g., enterprise security system 130 and/or other enterprise security system 140), the notification indicating the presence of the toxic access permissions amongst the enterprise users. Subsequently, production protection computing platform 110 may repeat one or more steps of the example event sequence discussed above in providing production protection.

Accordingly, one or more aspects of the systems and methods described herein may be used to address technical difficulties associated with identity and access management. For example, by aggregating permission data from various system of records, classifying entitlements based on applications they correspond to and computing environment they give access to, tagging user roles, predicting if granting a permission would result in toxic access permissions assigned to a user, integrating enterprise rules for access management, among other features, the production protection correlation engine herein provides an effective, efficient, scalable, and convenient technical solution for identifying toxic users with accuracy. This enables prevention of unauthorized access to secure information systems.

Figure 4:
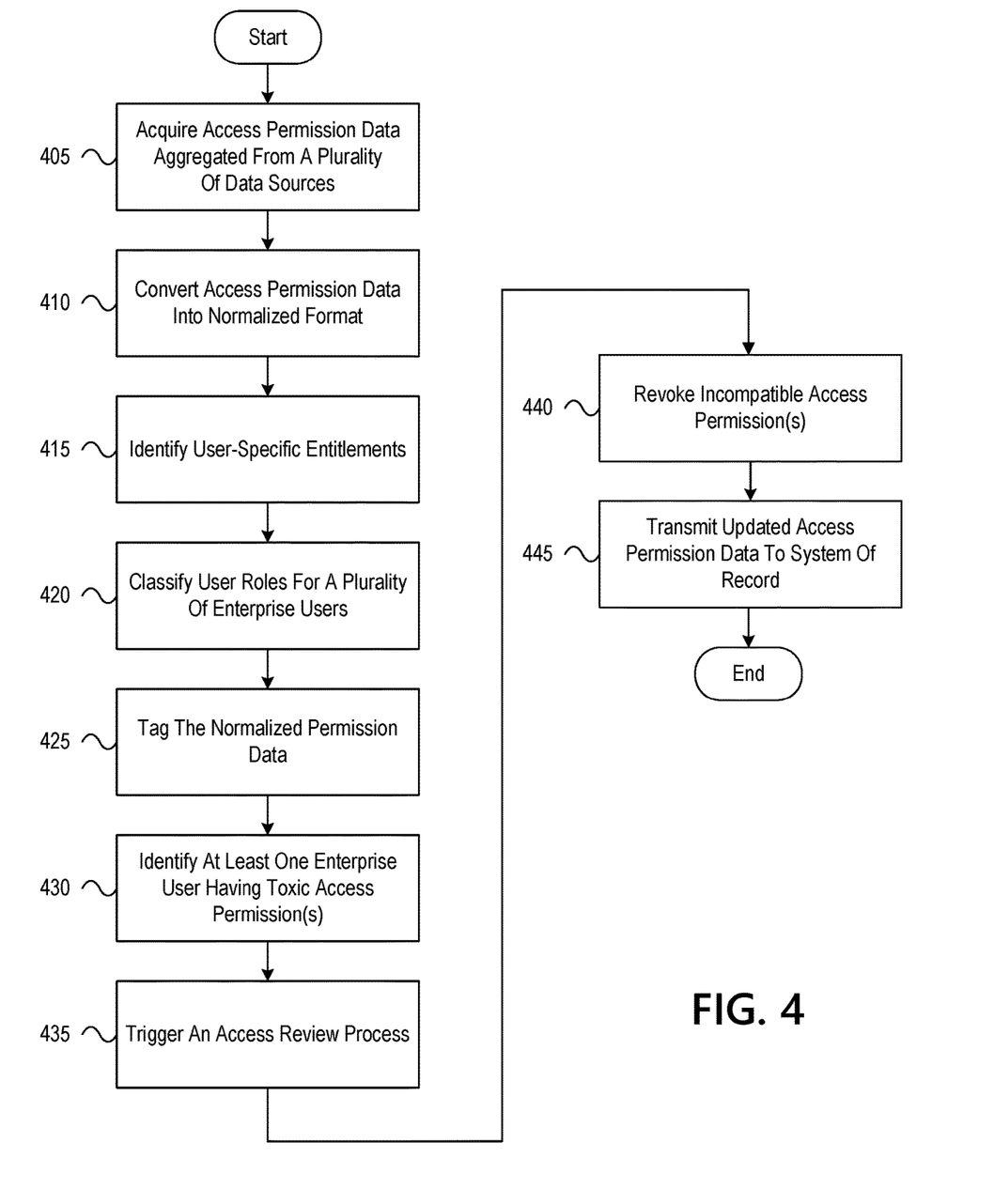
FIG. 4 depicts an illustrative method for a production protection correlation engine in accordance with one or more example embodiments.

FIG. 4 depicts an illustrative method for a production protection correlation engine in accordance with one or more example embodiments. Referring to FIG. 4, at step 405, a computing platform having at least one processor, a communication interface, and memory may acquire, via the communication interface, access permission data. In addition, the access permission data may be aggregated from a plurality of data sources. At step 410, the computing platform may convert the access permission data into a normalized format. In addition, converting the access permission data into the normalized format may produce normalized permission data. At step 415, the computing platform may identify user-specific entitlements based on the normalized permission data. At step 420, the computing platform may classify user roles for a plurality of enterprise users. In addition, classifying the user roles for the plurality of enterprise users may produce user role classification data. At step 425, the computing platform may tag the normalized permission data based on the user role classification data. At step 430, based on tagging the normalized permission data, the computing platform may identify at least one enterprise user of the plurality of enterprise users having one or more toxic access permissions. At step 435, in response to identifying the at least one enterprise user of the plurality of enterprise users having the one or more toxic access permissions, the computing platform may trigger an access review process for the at least one enterprise user of the plurality of enterprise users having the one or more toxic access permissions. At step 440, based on triggering the access review process for the at least one enterprise user of the plurality of enterprise users having the one or more toxic access permissions, the computing platform may revoke one or more incompatible access permissions. In addition, revoking the one or more incompatible access permissions may produce updated access permission data. At step 445, the computing platform may transmit, via the communication interface, to a system of record, the updated access permission data. In addition, transmitting the updated access permission data to the system of record may cause the system of record to store the updated access permission data in a database and limit access to enterprise resources based on the updated access permission data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      acquire, via the communication interface, access permission data, wherein the access permission data is aggregated from a plurality of data sources;
      convert the access permission data into a normalized format, wherein converting the access permission data into the normalized format produces normalized permission data;
      identify user-specific entitlements based on the normalized permission data;
      classify user roles for a plurality of enterprise users, wherein classifying the user roles for the plurality of enterprise users produces user role classification data;
      tag the normalized permission data based on the user role classification data;
      based on tagging the normalized permission data, identify at least one enterprise user of the plurality of enterprise users having one or more toxic access permissions, wherein having one or more toxic access permissions include a user having a first user role and having access to both a production environment and a non-production environment;
      in response to identifying the at least one enterprise user of the plurality of enterprise users having the one or more toxic access permissions, trigger an access review process for the at least one enterprise user of the plurality of enterprise users having the one or more toxic access permissions;
      based on triggering the access review process for the at least one enterprise user of the plurality of enterprise users having the one or more toxic access permissions, revoke one or more incompatible access permissions, wherein revoking the one or more incompatible access permissions produces updated access permission data; and
      transmit, via the communication interface, to a system of record, the updated access permission data, wherein transmitting the updated access permission data to the system of record causes the system of record to store the updated access permission data in a database and limit access to enterprise resources based on the updated access permission data.

2. The computing platform of claim 1, wherein classifying the user roles for the plurality of enterprise users comprises:
   determining, for each enterprise user of the plurality of enterprise users, an enterprise role for the enterprise user based on organizational hierarchy information and the enterprise user's association with at least one computing environment of a plurality of enterprise computing environments.

3. The computing platform of claim 2, wherein determining, for each enterprise user of the plurality of enterprise users, the enterprise role for the enterprise user comprises determining the enterprise role for the enterprise user to be one of development, quality assurance, production, or DevOps.

4. The computing platform of claim 2, wherein the plurality of enterprise computing environments comprises the production environment and the non-production environment.

5. The computing platform of claim 4, wherein the non-production environment comprises one or more of: a development environment, a testing environment, or a quality assurance environment.

6. The computing platform of claim 1, wherein triggering the access review process comprises sending one or more user interfaces (UIs) to an enterprise security system.

7. The computing platform of claim 1, wherein the memory stores additional computer-readable instructions that, when executed by the at least one processor, cause the computing platform to:
generate a graphical representation of the normalized permission data; and
send, via the communication interface, to an enterprise security system, the graphical representation of the normalized permission data, wherein sending the graphical representation of the normalized permission data to the enterprise security system causes the enterprise security system to display the graphical representation of the normalized permission data.

8. The computing platform of claim 1, wherein the memory stores additional computer-readable instructions that, when executed by the at least one processor, cause the computing platform to:
generate a graphical representation of the updated access permission data; and
send, via the communication interface, to an enterprise security system, the graphical representation of the updated access permission data, wherein sending the graphical representation of the updated access permission data to the enterprise security system causes the enterprise security system to display the graphical representation of the updated access permission data.

9. The computing platform of claim 1, wherein converting the access permission data into a normalized format comprises converting the access permission data into the normalized format using one or more of: regular expression, data wrangling operations, structured query language, or natural language processing.

10. The computing platform of claim 1, wherein identifying user-specific entitlements based on the normalized permission data comprises identifying user-specific entitlements using machine learning.

11. The computing platform of claim 1, wherein the memory stores additional computer-readable instructions that, when executed by the at least one processor, cause the computing platform to:
monitor identification of enterprise users having one or more toxic access permissions;
generate a notification indicating a presence of the toxic access permissions amongst the enterprise users; and
send, via the communication interface, to an enterprise security system, the notification indicating the presence of the toxic access permissions amongst the enterprise users.

12. A method, comprising:
at a computing platform comprising at least one processor, a communication interface, and memory:
acquiring, by the at least one processor, via the communication interface, access permission data, wherein the access permission data is aggregated from a plurality of data sources;
converting, by the at least one processor, the access permission data into a normalized format, wherein converting the access permission data into the normalized format produces normalized permission data;
identifying, by the at least one processor, user-specific entitlements based on the normalized permission data;
classifying, by the at least one processor, user roles for a plurality of enterprise users, wherein classifying the user roles for the plurality of enterprise users produces user role classification data;
tagging, by the at least one processor, the normalized permission data based on the user role classification data;
based on tagging the normalized permission data, identifying, by the at least one processor, at least one enterprise user of the plurality of enterprise users having one or more toxic access permissions, wherein having one or more toxic access permissions include a user having a first user role and having access to both a production environment and a non-production environment;
in response to identifying the at least one enterprise user of the plurality of enterprise users having the one or more toxic access permissions, triggering, by the at least one processor, an access review process for the at least one enterprise user of the plurality of enterprise users having the one or more toxic access permissions;
based on triggering the access review process for the at least one enterprise user of the plurality of enterprise users having the one or more toxic access permissions, revoking, by the at least one processor, one or more incompatible access permissions, wherein revoking the one or more incompatible access permissions produces updated access permission data; and
transmitting, by the at least one processor, via the communication interface, to a system of record, the updated access permission data, wherein transmitting the updated access permission data to the system of record causes the system of record to store the updated access permission data in a database and limit access to enterprise resources based on the updated access permission data.

13. The method of claim 12, wherein classifying the user roles for the plurality of enterprise users comprises:
determining, by the at least one processor, for each enterprise user of the plurality of enterprise users, an enterprise role for the enterprise user based on organizational hierarchy information and the enterprise user's association with at least one computing environment of a plurality of enterprise computing environments.

14. The method of claim 12, further comprising:
generating, by the at least one processor, a graphical representation of the normalized permission data; and
sending, by the at least one processor, via the communication interface, to an enterprise security system, the graphical representation of the normalized permission data, wherein sending the graphical representation of the normalized permission data to the enterprise security system causes the enterprise security system to display the graphical representation of the normalized permission data.

15. The method of claim 12, further comprising:
generating, by the at least one processor, a graphical representation of the updated access permission data; and
send, by the at least one processor, via the communication interface, to an enterprise security system, the graphical representation of the updated access permission data, wherein sending the graphical representation of the updated access permission data to the enterprise security system causes the enterprise security system to display the graphical representation of the updated access permission data.

16. The method of claim 12, further comprising:
monitoring, by the at least one processor, identification of enterprise users having one or more toxic access permissions;
generating, by the at least one processor, a notification indicating a presence of the toxic access permissions amongst the enterprise users; and
sending, by the at least one processor, via the communication interface, to an enterprise security system, the notification indicating the presence of the toxic access permissions amongst the enterprise users.

17. One or more non-transitory computer-readable media storing instructions that, when executed by a computing platform comprising at least one processor, a communication interface, and memory, cause the computing platform to:
acquire, via the communication interface, access permission data, wherein the access permission data is aggregated from a plurality of data sources;
convert the access permission data into a normalized format, wherein converting the access permission data into the normalized format produces normalized permission data;
identify user-specific entitlements based on the normalized permission data;
classify user roles for a plurality of enterprise users, wherein classifying the user roles for the plurality of enterprise users produces user role classification data;
tag the normalized permission data based on the user role classification data;
based on tagging the normalized permission data, identify at least one enterprise user of the plurality of enterprise users having one or more toxic access permissions, wherein having one or more toxic access permissions include a user having a first user role and having access to both a production environment and a non-production environment;
in response to identifying the at least one enterprise user of the plurality of enterprise users having the one or more toxic access permissions, trigger an access review process for the at least one enterprise user of the plurality of enterprise users having the one or more toxic access permissions;
based on triggering the access review process for the at least one enterprise user of the plurality of enterprise users having the one or more toxic access permissions, revoke one or more incompatible access permissions, wherein revoking the one or more incompatible access permissions produces updated access permission data; and
transmit, via the communication interface, to a system of record, the updated access permission data, wherein transmitting the updated access permission data to the system of record causes the system of record to store the updated access permission data in a database and limit access to enterprise resources based on the updated access permission data.

18. The one or more non-transitory computer-readable media of claim 17, wherein classifying the user roles for the plurality of enterprise users comprises:
determining, for each enterprise user of the plurality of enterprise users, an enterprise role for the enterprise user based on organizational hierarchy information and the enterprise user's association with at least one computing environment of a plurality of enterprise computing environments.

19. The one or more non-transitory computer-readable media of claim 17, wherein the instructions are configured to, when executed, further cause the computing platform to:
generate a graphical representation of the normalized permission data; and
send, via the communication interface, to an enterprise security system, the graphical representation of the normalized permission data, wherein sending the graphical representation of the normalized permission data to the enterprise security system causes the enterprise security system to display the graphical representation of the normalized permission data.

20. The one or more non-transitory computer-readable media of claim 17, wherein the instructions are configured to, when executed, further cause the computing platform to:
monitor identification of enterprise users having one or more toxic access permissions;
generate a notification indicating a presence of the toxic access permissions amongst the enterprise users; and
send, via the communication interface, to an enterprise security system, the notification indicating the presence of the toxic access permissions amongst the enterprise users.

* * * * *